US005712778A

United States Patent [19]

Moon

[11] Patent Number: 5,712,778

[45] Date of Patent: Jan. 27, 1998

[54] VOLTAGE MULTIPLYING DC-DC CONVERTER FOR A THIN FILM TRANSISTOR LIQUID CRYSTAL DISPLAY

[75] Inventor: Seung-hwan Moon, Seoul, Rep. of Korea

[73] Assignee: Samsung Electronics Co., Ltd., Suwon, Rep. of Korea

[21] Appl. No.: 633,288

[22] Filed: Apr. 16, 1996

[30] Foreign Application Priority Data

Apr. 18, 1994 [KR] Rep. of Korea ........................ 95-9107

[51] Int. Cl.[6] ........................ H02M 3/07

[52] U.S. Cl. ........................ 363/60; 363/59

[58] Field of Search ........................ 363/59, 60

[56] References Cited

U.S. PATENT DOCUMENTS

| | | | |
|---|---|---|---|
| 3,818,484 | 6/1974 | Nakamura et al. | 340/324 R |
| 4,807,104 | 2/1989 | Floyd et al. | 363/59 |
| 5,036,229 | 7/1991 | Tran | 307/497 |
| 5,095,223 | 3/1992 | Thomas | 363/60 |
| 5,132,895 | 7/1992 | Kase | 363/60 |
| 5,187,421 | 2/1993 | Naito | 363/59 |
| 5,463,542 | 10/1995 | Okamoto | 363/60 |
| 5,502,629 | 3/1996 | Ito et al. | 363/60 |
| 5,563,779 | 10/1996 | Cave et al. | 363/59 |
| 5,572,414 | 11/1996 | Komori | 363/60 |

FOREIGN PATENT DOCUMENTS

| | | | |
|---|---|---|---|
| 2 078 021 | 12/1981 | United Kingdom | H02M 3/02 |

*Primary Examiner*—Jeffrey L. Sterrett
*Attorney, Agent, or Firm*—Cushman Darby & Cushman, IP Group of Pillsbury Madison & Sutro LLP

[57] ABSTRACT

A DC-DC converter for a TFT-LCD includes first and second switches which are turned on/off in opposition according to a polar signal and third and fourth switches which are turned on/off in opposition according to an inverse polar signal. First and second diodes form electric paths in accordance with the first and the second switches, and third and fourth diodes form electric paths in accordance with the third and fourth switches. A first capacitor is charged when the electric paths of the first and second diodes are provided and a second capacitor is charged when the electric paths of the third and fourth diodes are provided. A third capacitor is charged by the electric charges of the first and the second capacitors. Using this circuit, a DC-DC power converter can be constructed which uses very little power and therefore can be employed in a TFT-LCD of portable information processing equipment.

3 Claims, 5 Drawing Sheets

VOLTAGE MULTIPLYING DC-DC CONVERTER FOR A THIN FILM TRANSISTOR LIQUID CRYSTAL DISPLAY

BACKGROUND OF THE INVENTION

1. Field of the Invention

The present invention relates to a direct current-direct current (DC-DC) converter for a thin film transistor liquid crystal display (TFT-LCD), and more particularly, to a low power consumption DC-DC converter which can be used in displaying devices for portable information processing equipment.

2. Description of the Related Art

A conventional DC-DC converter for a TFT-LCD will now be described. FIG. 1, is a graph illustrating a light-transmission ratio of a TFT-LCD. As illustrated in FIG. 1, TFT-LCD contrast increases with voltage because the light transmission ratio changes according to the applied voltage.

FIG. 2 is a detailed circuit diagram of a conventional gray voltage generating circuit. As shown in FIG. 2, a gray voltage is generated from the divided voltage of the resistors and the contrast is marked by applying one of the gray voltages to the liquid crystal capacitor.

FIG. 3 is a detailed circuit diagram of a conventional gray voltage generating circuit. As shown in FIG. 3, a conventional TFT-LCD includes a thin film transistor, a liquid crystal capacitor connected between a drain terminal and a common voltage Vcom of the TFT, plural gate lines, and switches connected to each source line and each gate line.

Operation of the conventional TFT-LCD described above will now be explained. First, one gray voltage of the plural gray voltages V1~V6 is selected with the switches $S_m$, $S_{m+1}$, $S_{m+2}$ to $S_{m+n}$ connected to the source line. Then, once a gate switch Sn connected to the gate line is turned on, the TFTs associated with this gate line are turned on by an applied voltage Von to the gate terminal of the TFTs which are connected to an nth gate line. Once the TFTs of the nth line are turned on, the gray voltage on each source line is applied to the liquid crystal capacitors associated with the $S_n$ gate line TFTs and the contrast is displayed on these liquid crystal capacitors. Thereafter, after one gray voltage of the gray voltages V1~V6 is selected with the switches $S_m$, $S_{m+1}$, $S_{m+2}$, to $S_{m+n}$ connected to the respective source lines, the gate switch of the n+1th line is turned on simultaneously as the gate switch of the nth line is turned off, and the power voltage Von is then applied to the gate terminal of the TFTs connected to the n+1th gate line and the TFTs associated with the n_1th gate line are turned on. Once the TFTs of the n+1th line are turned on, the gray voltage on each source line is applied to the associated liquid crystal capacitors via the n+1th gate line TFTs and the contrast is displayed on the liquid crystal display.

If the above processing is repeated, a desired picture image can be formed wholly by such displayed contrast on the liquid crystal capacitors.

A typical TFT-LCD is driven by inverting by gate lines, once the nth gate line is selected, one of the gray voltages V1~V3 is loaded on the source line. Next, when the n+1th gate line is selected, one of the gray voltages V4~V6 is loaded on the source line. Namely, in driving the line with inversion, as in FIG. 1 illustrating a relation between the voltage and the light-transmission ratio, once the curvilinear points of the relation between the voltage and the light-transmission ratio laid at the right side from Vcom are selected as the liquid crystal capacitor of one line, the curvilinear points of the relation between the voltage and the light-transmission ratio laid at the left side from Vcom are selected as the next liquid crystal capacitor of one line.

Since a signal which is used as the basis of selecting a polarity of the liquid crystal capacitor, is one of polar signal POL or inverse polar signal POLB as illustrated in FIG. 4, the switches $S_m$, $S_{m+1}$, $S_{m+2}$ select one of the gray voltages V1~$V_3$ or V4~V6 on the basis of the signals POL, POLB. For instance, one voltage of the gray voltages V1~V3 is selected when a polar signal POL is at a Vdd level, one voltage of the gray voltages V4~V6 is selected when the polar signal POL is at a GND level.

In the gray voltage generating circuit, as illustrated in FIG. 2, a power voltage Vcc is an output power source of the DC-DC converter which is at a voltage level above 8 V. The DC-DC converter converts from a Vdd power source of 5 V level to a direct current power voltage Vcc of above 8 V.

FIG. 5 is a detailed circuit diagram illustrating a conventional DC-DC converter. As shown in FIG. 5, a conventional DC-DC converter for a TFT-LCD includes a pulse width modulation integrated circuit PWMIC 51 having a power terminal connected to the power source Vdd, a coil L51 having one terminal connected to the power source Vdd, a transistor Q51 having a collector terminal connected to the other terminal of the coil L51, a base terminal connected to an output terminal of the PWMIC 51 and a grounded emitter terminal, a diode D51 having an anode terminal connected to the collector terminal of the transistor Q51 and a capacitor C51 connected between a cathode terminal and a ground of the diode D51.

Operation of this conventional DC-DC converter for a TFT-LCD will now be described. A PWMIC 51 generates a rectangular pulse and controls a duty ratio, so that a constant DC voltage will be output. If an output DC voltage is above a predetermined value, the duty ratio is reduced, to thereby lower the output DC voltage, and vice versa.

The transistor Q51 is turned on when the rectangular pulse outputted from the output terminal of the PWMIC 51 is at a high level and the amount of power flowing through the coil L51 is increasing in proportion to the time.

The amount of the power $I_L$ is calculated according to the following equation:

$$I_L = \frac{Vdd}{V} T \tag{1}$$

In equation (1), T denotes a turn-on time of the transistor Q51.

Next, the transistor Q51 is turned off when the rectangular pulse outputted from the output terminal of the PWMIC 51 is at a low level, thus causing the power flowing through coil L51 to be cut off, and causing a high voltage to turn on the diode D51, so that the power accumulated as a magnetic field on the coil L51 may flow through the diode D51 and charge the capacitor C51. The charged voltage Vcc is used for the power voltage to generate a gray voltage.

However, the prior DC-DC converter for a TFT-LCD consumes too much power. Although the actual power consumed by the DC-DC converter is only 3 mA, the power needed for the electronic circuit, PWMIC, internal resistance of the coil, of the DC-DC converter is more than 20 mA.

The power conversion efficiency may be expressed according to equation 2:

$$\frac{\text{output power}}{\text{input power}} \times 100\% = \frac{Vcc \times 3\text{mA} \times 100\%}{Vdd \times 20\text{mA} + Vcc \times 3\text{mA}} \tag{2}$$

In equation (2), if Vdd=5 V, Vcc=8 V, the power conversion efficiency of a conventional DC-DC converter is only 20%, which is too wasteful to realistically be applied to a portable information processing equipment display.

SUMMARY OF THE INVENTION

An object of the present invention is to solve the problems involved in conventional apparatuses, and to provide a DC-DC converter for a TFT-LCD to be used in portable information processing equipment which itself requires very little power.

To achieve this object and others, the present invention includes first and second switches which are turned on or off in opposition according to a polar signal. First and second diodes form electric paths by being turned on when the first and second switches are turned on to thereby charge a first capacitor. Third and fourth switches are turned on/off in opposition according to an inverse polar signal. Third and fourth diodes form electric paths when the third and fourth switches are turned on to thereby charge a second capacitor. A third capacitor is charged by the electric charges of the first and the second capacitors.

Preferably, the polar signal and the inverse polar signal have opposite phases. PMOS or NMOS type transistors can form the four switches and first and second diodes, and third and fourth diodes may be serially connected in positive direction. Plural diodes may be connected to form any one diode.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

A preferred embodiment will now be described with particular reference to FIGS. 6 and 7.

Figure 1:
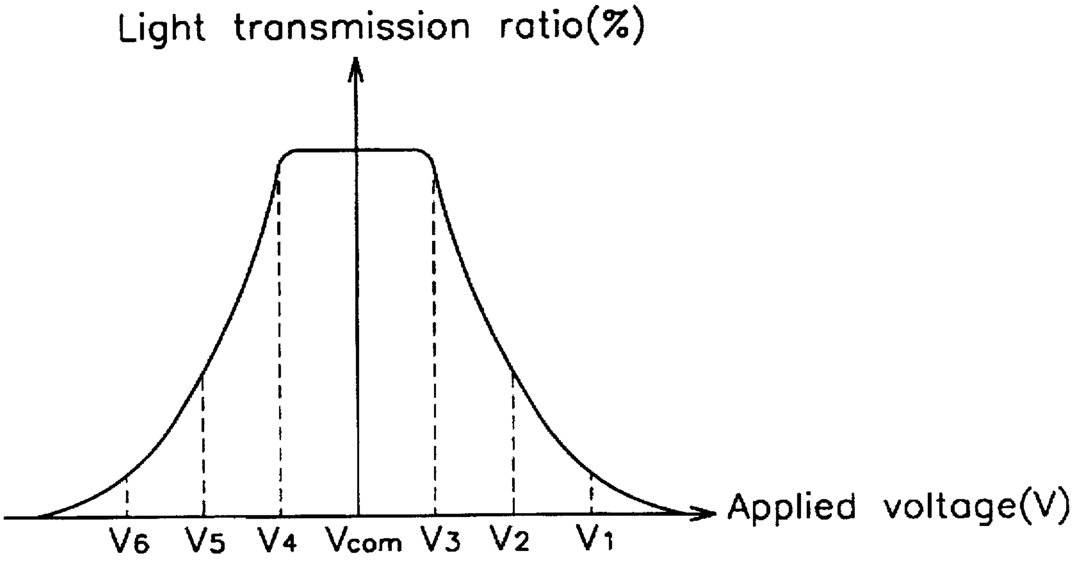
FIG. 1 is a graph illustrating a liquid crystal light-transmission ratio.
Figure 2:
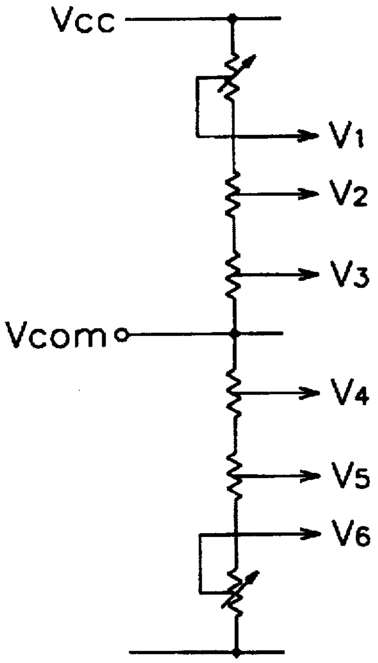
FIG. 2 (Prior Art)
FIG. 2 is a detailed circuit diagram of a conventional gray voltage generating circuit.
Figure 3:
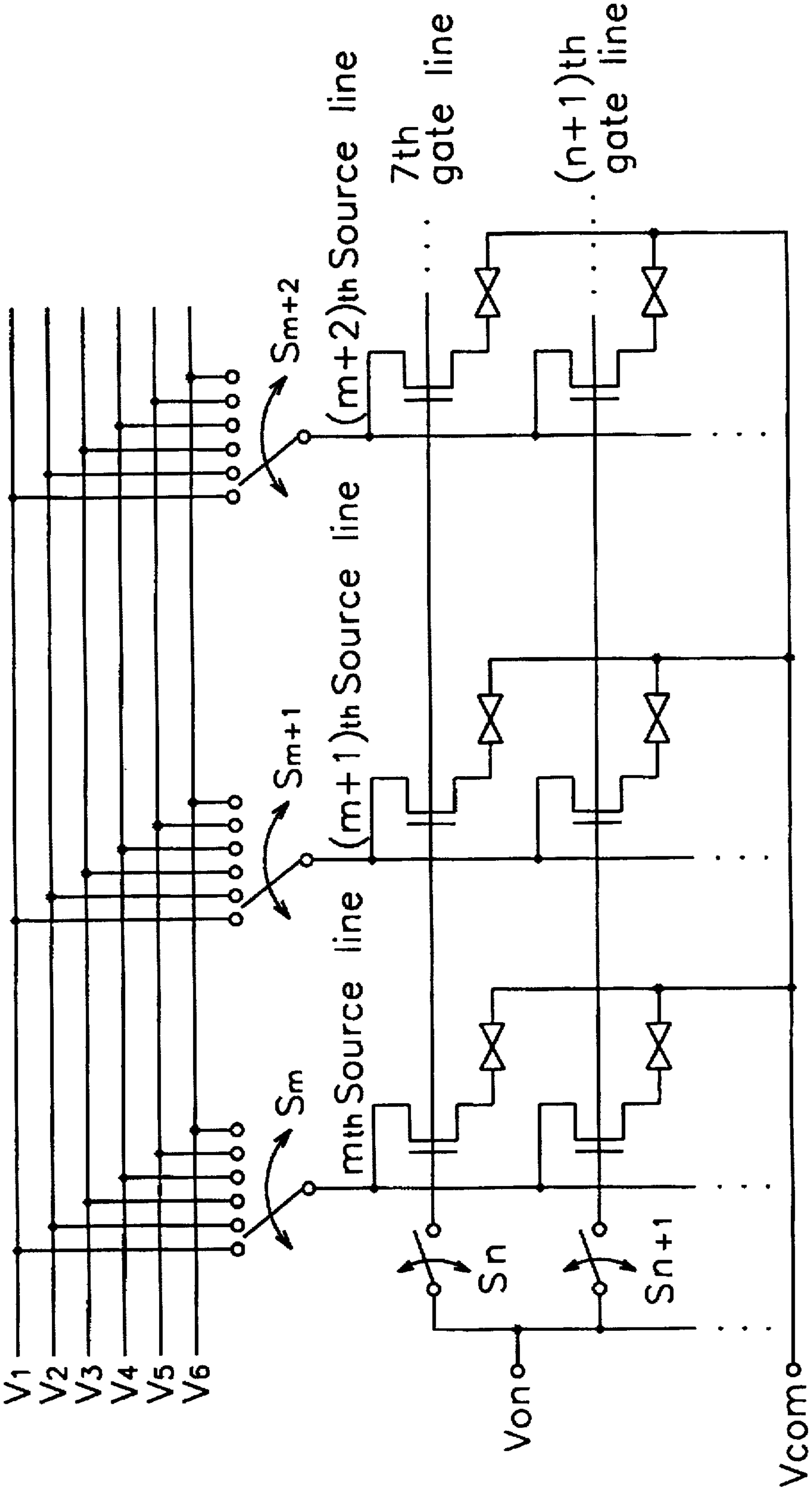
FIG. 3 (PRIOR ART)
FIG. 3 is a detailed circuit diagram of a conventional TFT-LCD.
Figure 4:
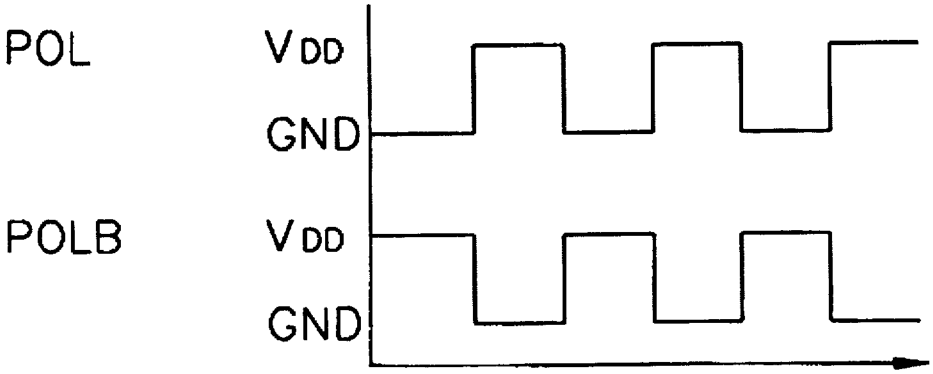
FIG.4 (PRIOR ART)
FIG. 4 is a wave form for an inverse driving of a typical TFT-LCD.
Figure 5:
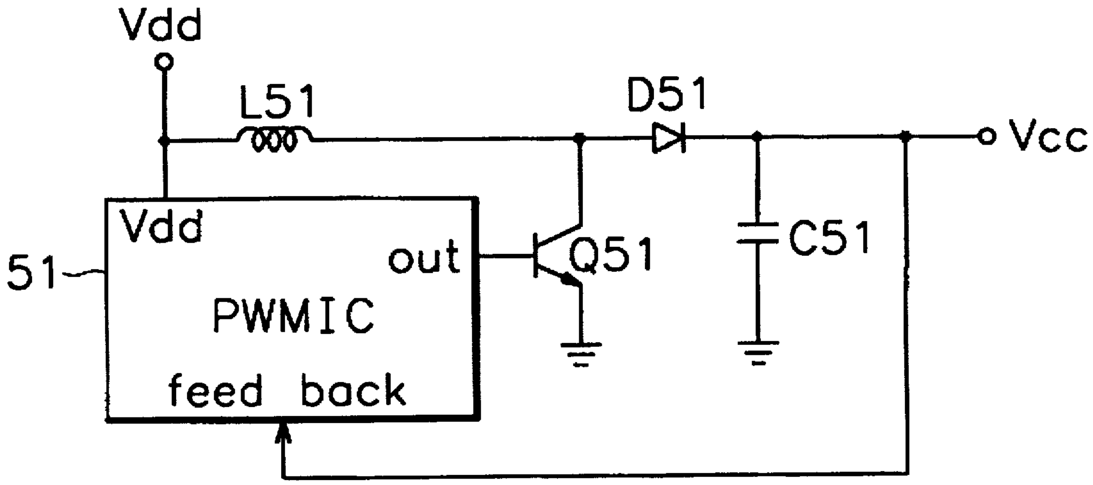
FIG.5 (PRIOR ART)
FIG. 5 is a detailed circuit diagram of a conventional TFT-LCD.
Figure 6:
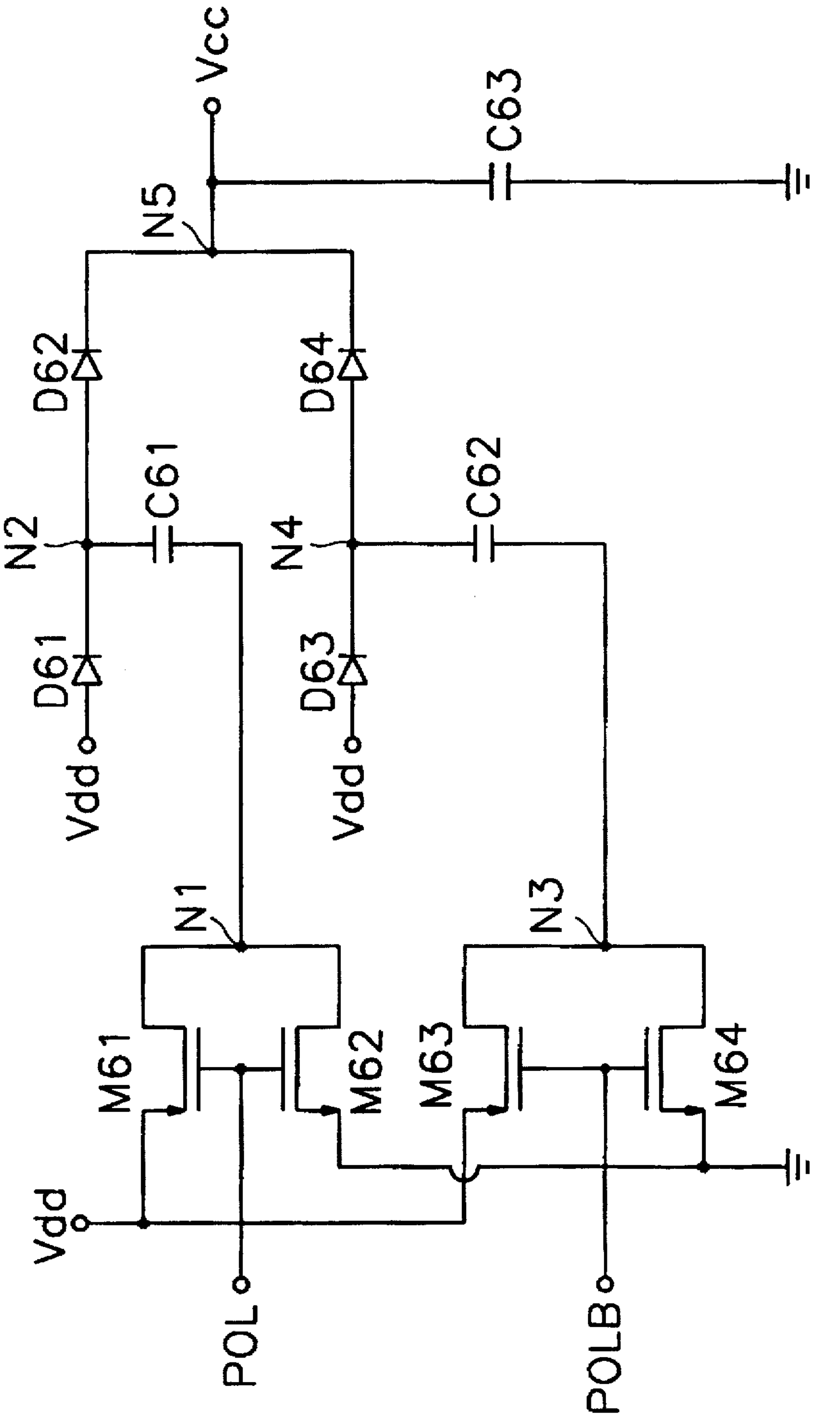
FIG. 6 is a detailed circuit diagram of a DC-DC converter for TFT-LCD according to a preferred embodiment of the present invention.

As shown in FIG. 6, a DC-DC converter for a TFT-LCD according to a preferred embodiment of this invention includes transistors M61, M62 having their source terminals connected to a power signal line Vdd and a ground signal line GND, respectively, and their gate terminals connected in common to a polar signal line POL. The converter also includes transistors M63, M64 having their source terminals connected to the power signal line Vdd and the grounded signal line GND, respectively, and their gate terminal jointly connected to a inverse polar signal line POLB.

Diodes D61 and D63 are provided, the anodes of which are connected to power signal line Vdd. Diodes D62 and D64 have their anode terminals connected to the cathode terminals of diodes D61 and D63, respectively. The cathode terminals of the diodes D62 and D64 are connected together, and a capacitor is connected between the cathode terminals of the diodes D62, D64 and ground.

In the preferred embodiment of the invention, the diodes D61, D62, D63, and D64 are used in pairs with each signal POL or POLB, however plural diodes can be used instead of only two diodes.

Operation of the TFT-LCD according to the preferred embodiment of the invention is described below.

Figure 7:
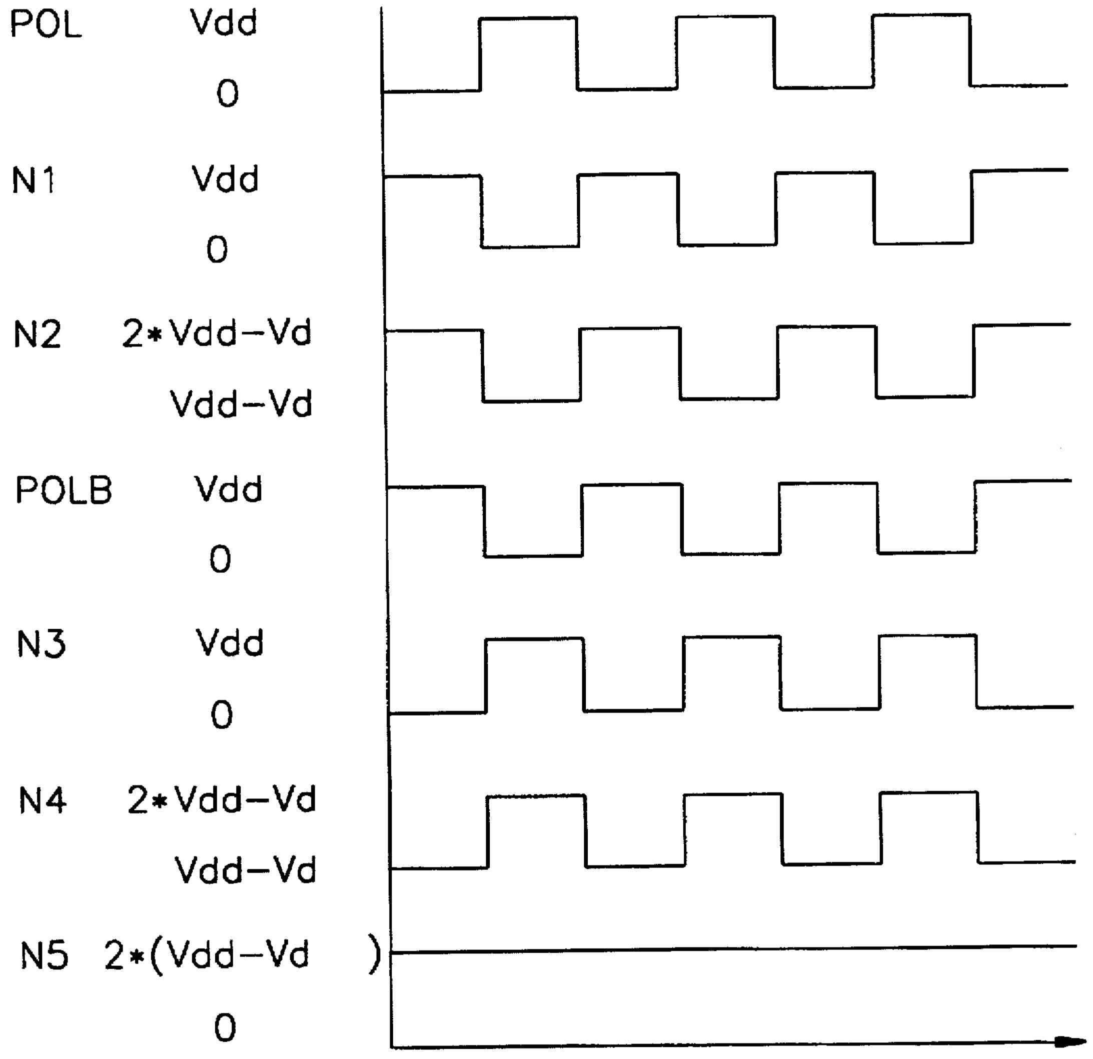
FIG. 7 is a wave form illustrating each sectional operation of a DC-DC converter for a TFT-LCD according to a preferred embodiment of this invention.

As illustrated in FIG. 7, when the signal POL has a ground potential, the power signal Vdd is applied to a Node N1 by turning on the PMOS type transistor M61. When the POL is at a power level, the ground level signal is applied to a node N1 by turning on the NMOS type transistor M62. Accordingly, a pulse wave form signal is generated in the node N1 according to the POL signal as illustrated in FIG. 7.

When the node N1 is at a ground level, the electrons applied through the diode D61 are charged to the capacitor C61. The amount of charge accumulated by the capacitor C61 is calculated according to equation 3 below:

$$Q61=C61\times(Vdd-Vd) \quad (3)$$

in which Vd denotes the voltage drop across the diode D61.

When the node N1 is at a power level Vdd, the potential of the node N2 is (Vdd+Q61/C61), which may be combined with equation 3 to get (2 Vdd−Vd). In this case the diode D61 is turned off from the applied reverse-bias, and the electrons at node N2 are transferred to the capacitor C63 by turning on the diode D62.

The amount of the electrons Q63 charged to the capacitor C63 flows though the diode D62 until the diode D62 is turned off, and is calculated according to equation 4 below.

$$Q63=C63\times2\times(Vdd-Vd) \quad (4)$$

Since the voltage Vcc of the node N5 is (Q63/C63), the voltage Vcc is 2(Vdd−Vd).

As illustrated in FIG. 7, when the inverse polar signal POLB is at a ground level, the PMOS type transistor M63 is turned on and a power signal Vdd is applied to the node N3. When the inverse polar signal POLB is at a power level Vdd, the NMOS type transistor M64 is turned on and the ground level signal is applied to the node N3. Accordingly, a pulse wave form signal as in FIG. 7 is generated to the node N3 in accordance to the inverse polar signal POLB.

When the node is at a ground level, the electrons applied through the diode D63 are charged to the capacitor C62, the amount of electron Q62 charged to the capacitor C62 is calculated as the equation 5 below.

$$Q62=C62\times(Vdd-Vd) \quad (5)$$

where Vd is the voltage drop across the diode D63.

When the node N3 is at a power level Vdd, a potential of the node N4 is (Vdd+Q62/C62) and results in (2 Vdd−Vd) with the equation 5. In this case the diode D63 is turned off from the applied reverse-bias, and the electron of the node N4 is charged to the capacitor C63 by the turn on of the diode D64.

The charge Q63 applied to the capacitor C63 flows though the diode D64 until the diode D64 is turned off, and is calculated as the equation 6 below.

$$Q63=C63\times2\times(Vdd-Vd) \quad (6)$$

Since the voltage Vcc of the node N5 is (Q63/C63) the voltage Vcc is equal to 2(Vdd−Vd).

The polar signal POL and the inverse polar signal POLB are of opposite phase. Therefore, generalizing the whole operation, a constant direct current voltage Vcc equal to 2(Vdd−Vd), is outputted to the node N5 as illustrated in FIG. 7. Accordingly, the small power consuming DC-DC converter can be provided by supplying a stabilized direct current voltage Vcc using MOS transistors M61 to M64 and diodes D61 to D64 which consume low amounts of power. If a number of the diodes D611 to D64 is controlled, the value of the direct current voltage Vcc can be randomly set.

The preferred embodiment of the invention provides a DC-DC converter for a TFT-LCD which may be used in portable information processing equipment because the DC-DC converter consumes very little power.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A DC-DC converter for a TFT-LCD, comprising:

a first PMOS type transistor and a first NMOS type transistor which have source terminals connected to a power signal line and a ground line, respectively, gate terminals connected in common to a first polar signal line, and drain terminals;

a second PMOS type transistor and a second NMOS type transistor which have source terminals connected to the power signal line and the ground line, respectively, gate terminals connected in common to a second polar signal line, and drain terminals;

first and second diodes which have anode terminals connected to the power signal line, respectively, and cathode terminals;

third and fourth diodes which have anode terminals connected to the cathode terminals of the first and second diodes, respectively, and cathode terminals;

a first capacitor which is connected between the cathode terminal of the first diode and the drain terminal of the first PMOS type transistor connected in common to the drain terminal of the first NMOS type transistor;

a second capacitor which is connected between the cathode terminal of the second diode and the drain terminal of the second PMOS type transistor connected in common to the drain terminal of the second NMOS type transistor; and a third capacitor which is connected between the ground line and the cathode terminal of the third diode connected in common to the cathode terminal of the fourth diode.

2. A DC-DC converter for a TFT-LCD as defined in claim 1, wherein said first and second polar signals are inverse polar signals having opposite phases.

3. A DC-DC converter for a TFT-LCD, comprising:

a switch circuit which inputs a polar signal and an inverse polar signal and outputs a first pulsed voltage to a first node and a second pulsed voltage to a second node;

a charge circuit connected between the first and second nodes and an output node, the charge circuit further connected to a power source having a power source voltage such that third and fourth nodes within the charging circuit are intermittently raised by a capacitor to a charging voltage level which exceeds the power source voltage; the third and fourth nodes each connected through a diode to the output node; and a smoothing capacitor connected to the output node.

* * * * *